US012304685B2

(12) United States Patent
Baumeister

(10) Patent No.: US 12,304,685 B2
(45) Date of Patent: May 20, 2025

(54) VERTICAL FLOW-WRAPPER WITH IMPROVED CORNER FOLDING

(71) Applicant: GEA Food Solutions Weert B.V., RV Weert (NL)

(72) Inventor: Bruno Gerfried Baumeister, Aachen (DE)

(73) Assignee: GEA FOOD SOLUTIONS WEERT B.V., Rv Weert (NL)

( * ) Notice: Subject to any disclaimer, the term of this patent is extended or adjusted under 35 U.S.C. 154(b) by 0 days.

(21) Appl. No.: 18/037,110

(22) PCT Filed: Nov. 8, 2021

(86) PCT No.: PCT/EP2021/080856

§ 371 (c)(1),
(2) Date: May 16, 2023

(87) PCT Pub. No.: WO2022/106226

PCT Pub. Date: May 27, 2022

(65) Prior Publication Data

US 2024/0017864 A1 Jan. 18, 2024

(30) Foreign Application Priority Data

Nov. 18, 2020 (EP) .................................... 20208289

(51) Int. Cl.
*B65B 9/20* (2012.01)
*B31B 70/26* (2017.01)
(Continued)

(52) U.S. Cl.
CPC ............ *B65B 9/207* (2013.01); *B31B 70/262* (2017.08); *B65B 7/00* (2013.01); *B65B 41/16* (2013.01);
(Continued)

(58) Field of Classification Search
USPC ............................................................ 53/551
See application file for complete search history.

(56) References Cited

U.S. PATENT DOCUMENTS

| | | | | |
|---|---|---|---|---|
| 2005/0069230 A1* | 3/2005 | Takahashi | B65D 75/008 383/107 |
| 2005/0241273 A1* | 11/2005 | Rimondi | B65B 59/001 53/389.4 |
| 2013/0199710 A1* | 8/2013 | Ishikawa | B65H 45/22 156/227 |

FOREIGN PATENT DOCUMENTS

| | | |
|---|---|---|
| EP | 1456084 A1 | 9/2004 |
| EP | 1456084 B1 | 10/2007 |

(Continued)

OTHER PUBLICATIONS

International Search Report and Written Opinion dated Feb. 10, 2022, for International Application PCT/EP2021/080856.

(Continued)

*Primary Examiner* — Chinyere J Rushing-Tucker
(74) *Attorney, Agent, or Firm* — The Dobrusin Law Firm, P.C.

(57) ABSTRACT

A vertical flow-wrapper that includes a folding unit for forming at least one fold in a moving web, the folding unit includes at least two sets of folding means; a sealing station downstream from the folding unit for sealing the at least one fold; a web feed, which feeds the web via the folding unit and the sealing station to a form-shoulder and a form-fill tube, which form the web into a web-tube; longitudinal sealing-means to seal longitudinal edges of the web tube together; and cross sealing means to provide a cross-seal to the web tube to produce individual packages. Each of the at least two sets of folding means include at least one rotating object, and an axis of rotation of the at least one rotating
(Continued)

object are provided along a line, and the line is provided at an angle relative to a transportation of the web.

9 Claims, 4 Drawing Sheets

(51) Int. Cl.

| | |
|---|---|
| ***B65B 7/00*** | (2006.01) |
| ***B65B 9/207*** | (2012.01) |
| ***B65B 41/16*** | (2006.01) |
| ***B65B 43/10*** | (2006.01) |
| ***B65B 51/10*** | (2006.01) |
| *B31B 160/20* | (2017.01) |

(52) U.S. Cl.
CPC .............. *B65B 43/10* (2013.01); *B65B 51/10* (2013.01); *B31B 2160/20* (2017.08)

(56) References Cited

FOREIGN PATENT DOCUMENTS

| | | | |
|---|---|---|---|
| EP | 2276668 | A1 | 1/2011 |
| EP | 2818311 | A1 | 12/2014 |
| JP | 2010083537 | A | 4/2010 |
| WO | 01/24999 | A1 | 4/2001 |

OTHER PUBLICATIONS

International Preliminary Report on Patentability dated Nov. 24, 2022, for International Application PCT/EP2021/080856.

* cited by examiner

View A – A

VERTICAL FLOW-WRAPPER WITH IMPROVED CORNER FOLDING

CROSS REFERENCE TO RELATED APPLICATIONS

This application is a US national stage of PCT/EP2021/080856 filed on Nov. 8, 2021, which claims priority to EP 20208289.7 filed Nov. 18, 2020, all of which are hereby incorporated by reference herein for all purposes.

FIELD

The invention relates to a vertical flow-wrapper and to a method to provide folds in a web.

BACKGROUND

The present invention relates to a vertical flow-wrapper as it is for example disclosed in EP 1 456 084 B1 or EP 2 276 668. A vertical flow-wrapper, also called vertical flow wrapping machine, is a packaging machine that receives a plane continuous web, for example a film of plastic material, e.g., a thermoplastic material, a paper- or a cardboard-material or a combination of these materials, which is transported, preferably continuously, and passed downwardly over a form shoulder and a vertical form-fill tube and is thereby shaped into a tubular form, i.e. into a tubular web, by being wrapped around the vertical form-fill tube of the flow-wrapper. After being wrapped around the vertical form-fill tube, the web is longitudinally closed by means of a longitudinally extending seal, which is applied to the web especially by heat sealing the lateral/longitudinal margins of the web or by heat sealing in the vicinity of these margins thereby joining them. This is carried out by so called longitudinal-sealing means. The tubular web has conventionally a rectangular, elliptical or a circular cross-sectional area, but may also have any other regular or irregular cross-section. The tubular web is closed by cross-sealing means, preferably in a direction perpendicular to the transport direction of the web, i.e. transversely. Thereby, individual packages are defined out of the continuous tubular web. A product, such as a foodstuff, is introduced into the packages by dropping the product through the form-fill tube and into the tubular web surrounding the form-fill-tube. During and/or after filling, the tubular web is transversely open at its upper end, i.e. not cross-sealed. Simultaneously to the filling and/or thereafter, the tubular web together with the product is moved downwardly and then a top cross-seal is formed above the product and thereby a hermetically closed package is produced. As a last step or simultaneously to the application of the top seal, the package is separated from the tubular web by cutting means. The vertical flow-wrapper also comprises a folding- and preferably a sealing unit upstream from the form shoulder. The forming unit forms folds into the plane web, which improve the stability and/or the appearance for the produced package. There is a constant need to improve the flow-wrapper, particularly make it suitable for sustainable packaging material, like paper or cardboard.

SUMMARY

The purpose is attained by providing a vertical flow-wrapper comprising:

- a folding unit for forming at least one fold in a moving web of packaging material, the folding unit comprising at least two sets of folding means,
- preferably a sealing station downstream from the folding unit for sealing the formed folds,
- a web feed, which, preferably continuously, feeds the web via the folding unit and the preferred sealing station to a form-shoulder and a form-fill tube, which form the web into a web-tube,
- longitudinal sealing-means to seal the longitudinal edges of the web tube together and
- cross sealing means to provide a cross-seal to the web tube to produce individual packages, wherein, each set of folding means comprises at least one rotating object.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

The present invention relates to a, preferably continuously, operating vertical flow-wrapper. A vertical flow-wrapper is a packaging machine that receives a continuous plane web, for example a film of plastic material, e.g., a thermoplastic material, a paper- or a cardboard-material or a combination of these materials and forms it into packages. The web is transported, preferably continuously, and passed downwardly over a form shoulder and a vertical form-fill tube and is thereby shaped into a tubular form, i.e. into a tubular web, by being wrapped around the vertical form-fill tube of the flow-wrapper. After being wrapped around the vertical form-fill tube, the web is longitudinally closed by means of a longitudinally extending seal, which is applied to the web especially by heat sealing the lateral/longitudinal margins of the web or by heat sealing in the vicinity of these margins thereby joining them. This is carried out by so called longitudinal-sealing means. The tubular web has conventionally a rectangular, elliptical or a circular cross-sectional area, but may also have any other regular or irregular cross-section. The tubular web is closed by cross-sealing means, preferably in a direction perpendicular to the direction of flow of the web, i.e. transversely to the web transport direction. Thereby, individual packages are defined out of the continuous tubular web. A product, such as a foodstuff, is introduced into the packages by dropping the product through a form-fill tube and into the tubular web. During filling, the tubular web is transversely open at its upper end, i.e. not cross-sealed. Simultaneously to and/or after the filling, the tubular web together with the product is moved downwardly and then a top cross-seal is formed above the product and thereby a hermetically closed package is produced. As a last step or simultaneously to the application of the top seal, each package is separated from the tubular web by cutting means. The cutting means are preferably part of the cross-sealing means.

The inventive vertical flow wrapper also comprises, upstream from the form shoulder at least one folding unit for forming at least one fold in the moving web of packaging material. Preferably, the flow-wrapper comprises a multitude of folding units, particularly two, three, four or more. Each folding unit comprises one or two or at least two, preferably exactly two, sets of folding means, each folding means comprising at least one rotating object. The web is passed along the rotating objects and is thereby folded, particularly by their circumferences. The passing web rotate the rotating objects. The at least two rotating objects of one folding unit cooperate in providing one fold to the web.

A rotating object according to the present invention is any object that is axially symmetrical, that is provided rotatable and that preferably has an edge, preferably a pointed edge around which the web is folded. The rotating object preferably has two opposite ends, wherein more preferably one end of the object, particularly an end that is in contact with the web is preferably flat, i.e. dislike. The rotating object is for example a disk or a truncated cone with a circular cross section. The web is bent around the rotating object, preferably two rotating objects, and thereby folded.

Downstream from the folding unit, preferably a sealing unit is provided for sealing the formed fold. The sealing can be done with an adhesive and/or under the influence of heat and/or pressure.

Subsequently, the folded web is transported toward the form shoulder which forms the web into a tube.

Preferably, each set of folding means comprises a multitude of rotating objects. A circular shaped plane of each rotating object of one, preferably each, set of forming means is preferably provided in one single plane, which is preferably provided at an angle>0° and more preferably <90°, relative to a horizontal plane. These planes of the of rotating objects of two adjacent sets of folding means of one folding unit are preferably in parallel.

Preferably, the axis of rotation of the rotating objects of each set of folding means are provided along a line, preferably a straight line, a curved line or any other line-shape. More preferably, this line is provided at an angle relative to a transport direction of the web. More preferably, the angles of two sets of folding means which jointly form one fold, differ.

Preferably, two sets of folding means of one folding unit are vertically staggered. The two staggered folding means form a pair that folds one fold.

According to a preferred embodiment of the present invention, the outer circumference of the rotating objects of the two sets of folding means of one folding unit partially overlap.

Preferably, upstream from the folding unit, a first deformation edge is provided, which deforms the flat, 2D-shaped, web into a 3D-shape. This deforming means reduces the lateral extension of the web prior to folding.

Preferably, downstream from the folding unit and more preferably upstream from a preferred sealing unit that seals the fold, a second deformation edge is provided, which deforms the folded web, preferably back into an essentially flat shape with the exemption of the fold(s).

The upstream- and/or the downstream deforming edge is preferably a stationary part, with no rotating element, preferably a plate.

Another subject matter of the present invention is a method to provide folds into a plane moving web, wherein:

- the plane web is deformed by a first deformation edge into a 3-D shape,
- at least one fold is provided and
- the folded web is retransferred into an essentially flat shape by a second deforming edge.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

According to this embodiment of the present invention, the initially flat, i.e. 2D-shaped, web is first shaped into a 3D-shape, for example by bending the web transversely to its transport direction. Thereby, the lateral extension of the web, in comparison to the flat state, is reduced. Subsequently, the at least one fold is provided in the 3D-shaped web. This is preferably done by the folding unit disclosed above. Finally, the folded web is retransferred into an at least essentially plane shape by a second deforming edge with the exemption of the fold(s).

Preferably, the fold is flattened as well, so that it is parallel to the web.

Further details, features and advantages of the present inventions are demonstrated by the Figures and by the following description of preferred embodiments on the basis of the drawings. The drawings illustrate only exemplary embodiments of the present invention, which do not restrict the essential idea of the invention.

DETAILED DESCRIPTION OF THE DRAWINGS

In the different Figures the same parts are provided with the same reference signs.

Figure 1:
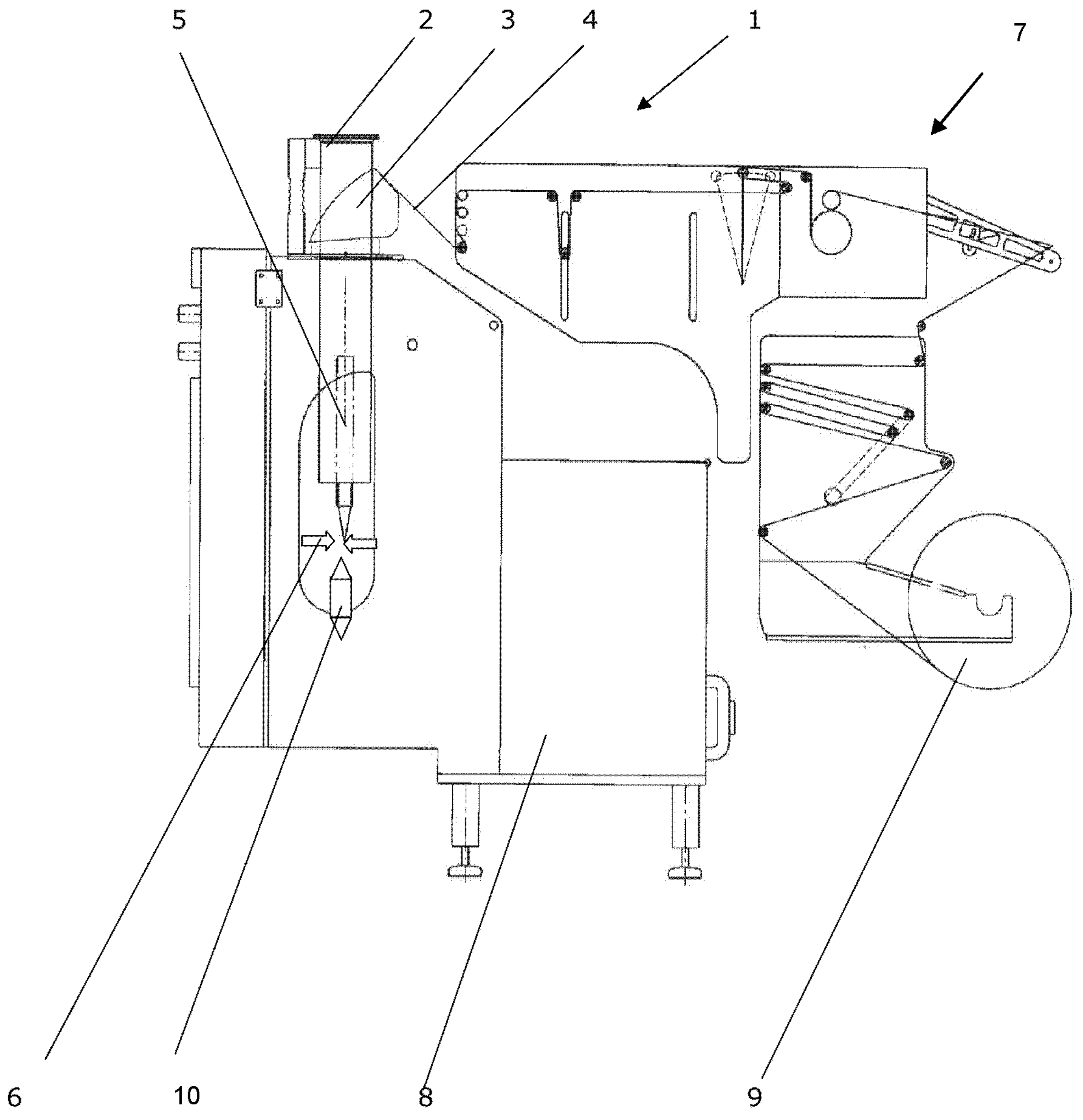
FIG. 1 schematically illustrates a flow-wrapper according to a preferred embodiment of the present invention.

In FIG. 1, the flow-wrapper 1 according to the invention is schematically shown, which comprises a frame 8. A web, here a film 4, especially a weldable plastic film 4, is preferably continuously supplied from a reel 9 to a form shoulder 3, which shapes the web 4 into a tubular form around a form-fill tube 2. In the context of the present invention, a "tubular form" of the packages 7 or of the web 4 means any cross-sectional form including a circular form or another form, and especially a square, rectangular- or generally a polygonal form. Longitudinal sealing means 5, which are provided downstream from the form shoulder 3, seal the edges of the tubular web 4 together along a longitudinal seal 11. Cross sealing means 6 provide cross seals 13 to the tubular web 4 at the downstream end of each package 10 and subsequently, the package is filled with a packaging item. Finally, an upstream cross seal 13 is applied to the web tube 4 by means of the cross sealing means 6, which hermetically closes each package 10. The cross sealing means 6 preferably apply simultaneously an upstream cross-seal closing the top of the package 10 and a downstream cross-seal defining the bottom of the subsequent, upstream package 10. The packages 10 are separated from one another by a cutting means 6, which are preferably incorporated into the cross-sealing means 6. For the application of each cross seal(s), the seal jaws are reciprocated from an open position, in which the seal jaws are spaced apart to a sealing position, in which the seal jaws are pressed together and apply a pressure on the film tube.

Upstream from the form shoulder 3 at least one folding unit 7 is provided, for forming at least one fold 20 in the moving web 4 of packaging material. Between the folding unit 7 and the form shoulder, a sealing unit (not depicted) may be provided for sealing the legs 26 of the formed fold 20 together. The sealing can be done with an adhesive and/or under the influence of heat and/or pressure.

Figure 2:
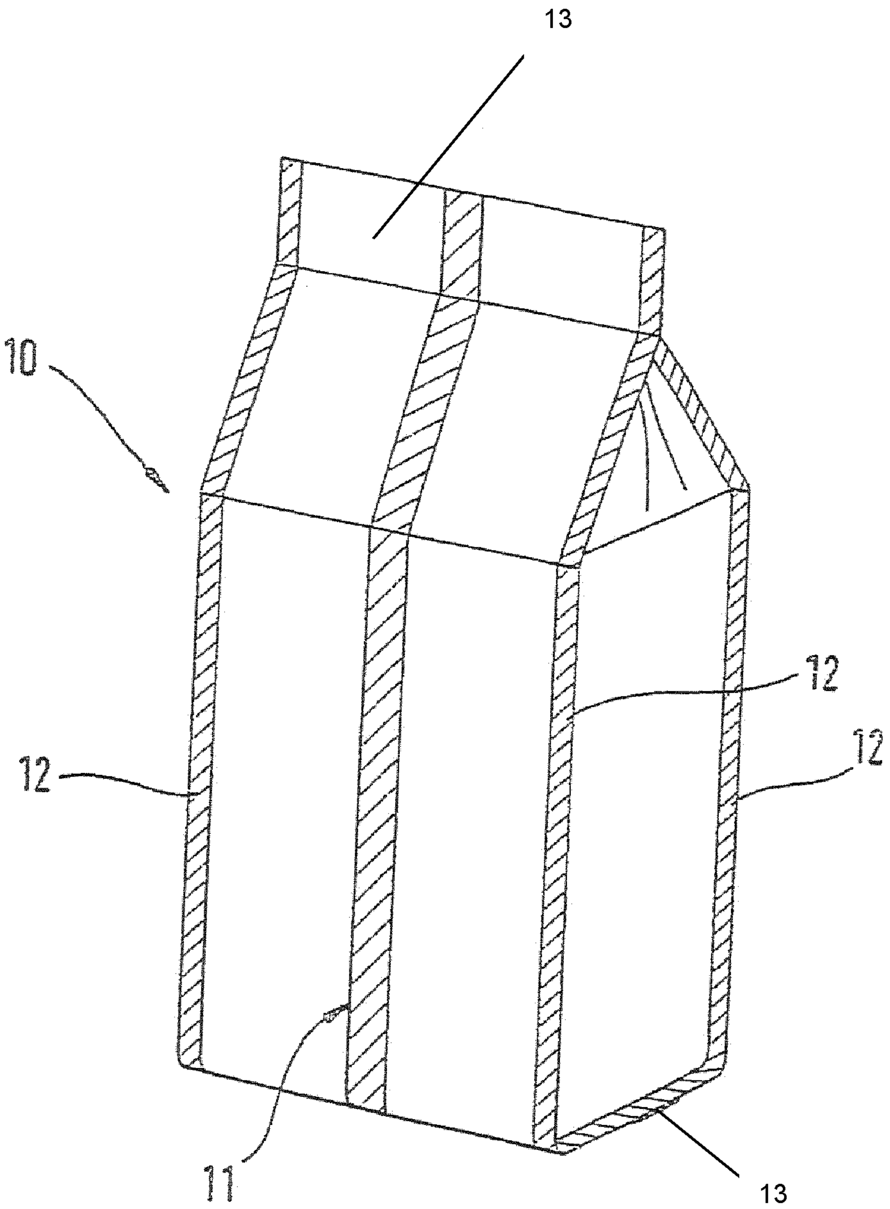
FIG. 2 shows a package that can be produced with the inventive flow-wrapper and/or the inventive method.

FIG. 2 depicts a package 10, that can be produced with the inventive flow-wrapper. In the present case the package comprises 4 corner folds; i.e. in the present case four folding units 7, provided side by side and in parallel are needed to produce these corner folds. The corner folds 12 may contribute to the stability and/or the outer appearance of the package 10. Parallel to the corner folds 12, a longitudinal seal 11 is provided and at its top and its bottom, the package 10 comprises a cross seal 13, respectively.

Figure 3:
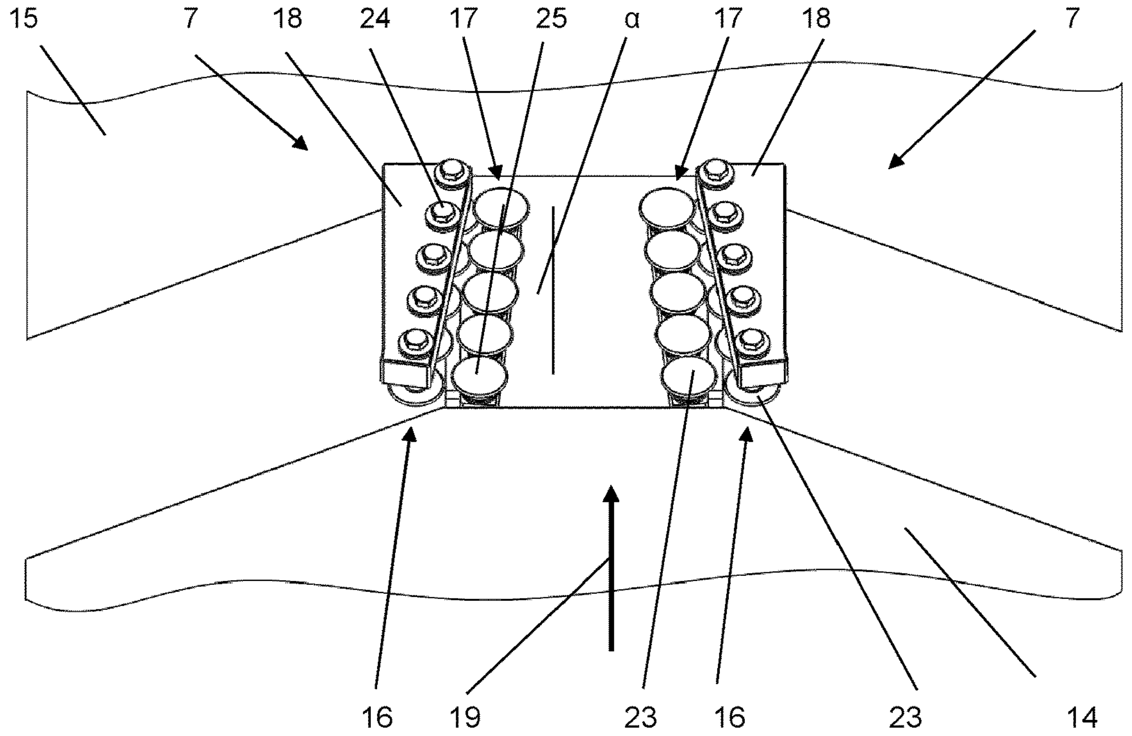
FIG. 3 depicts the folding unit.
Figure 6:
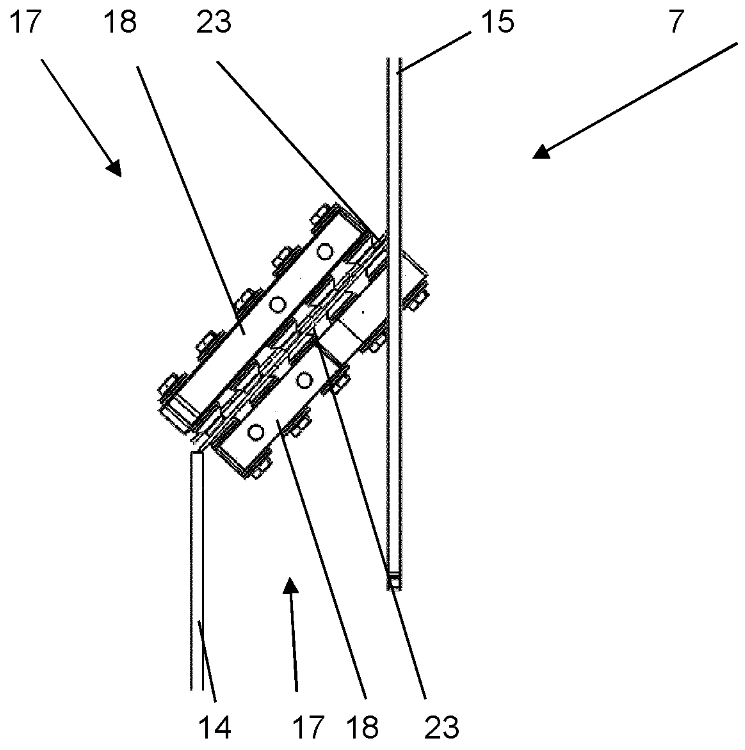
FIG. 6 is a side view of the folding unit.

FIGS. 3 and 6 show details of the folding unit 7, in the present case two folding units 7, which are located side by side, each producing a fold 20, respectively. For the production of the package according to FIG. 2, four of these folding units 7 are required side by side. A web 4 is transported past the folding unit(s) in a transport direction 19. All folding units 7 forming the folds of one package are preferably provided at the same angle of inclination. During folding, the path of the web is preferably parallel to this angle of inclination.

Each folding unit 7 has at least two adjacent sets of folding means 16, 17, each set of folding means 16, 17 comprising at least one rotating object 23, here five rotating objects 23 per set of folding means 16, 17. The rotating objects 23 of each set of folding means 16, 17 are provided at a support 18, respectively. The rotating objects 23 of two adjacent sets of folding means 16, 17 cooperate in forming one fold 20.

The pivot axis of all rotating objects 23 of each set of folding means 16, 17 are preferably provided along a line 25, here a straight line 25. Relative to the transport direction 19 of the film, the line 25 of the rotating objects of the set of folding means 16 has a different angle of inclination a than the line 25 of the rotating objects of the adjacent set of folding means 16.

The rotating objects 23 of each set of folding means 16, 17 each comprise a circular plane at one end, the end facing the web. These circular ends are preferably provided in one plane, respectively. In the present case, the circular planes of rotating objects 23 of the set of folding means 17 is located vertically above the circular planes of rotating objects 23 of the set of folding means 16.

As can be particularly seen from FIG. 3, some rotating objects 23 of two adjacent sets of folding means 16, 17, may overlap, particularly the downstream rotating object(s), here, relative to the transport direction 19, the last two rotating objects of the sets of folding means overlap.

Upstream from the folding units 7, a first deforming edge 14 is provided, which deforms the plane web into a bent shape. Downstream from the folding units, a second deforming edge 15 is provided, which flattens, the bent web again. The deforming edges 14, 15, here plates with no moving parts, are provided transverse to the transport direction of the web 4.

For folding, the web is transported along the first deforming edge 14, then passes the folding units 7 and is finally move along the second deforming edge 15. During folding, the web is passed along the rotating objects 23 of each folding unit 7 which cooperate in providing one fold to the web. The passing web rotate the rotating objects. The rotating objects are preferably not driven by a motor.

Figure 4:
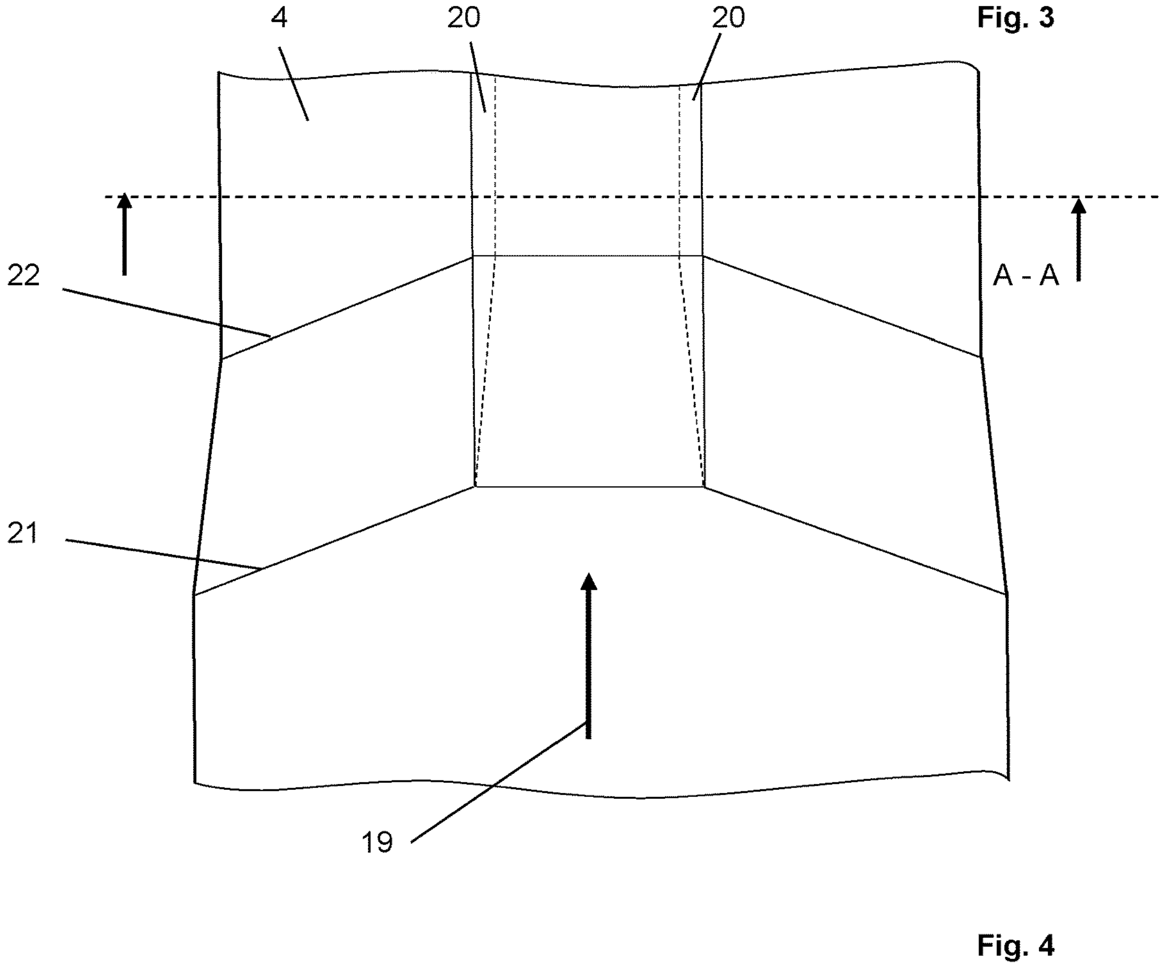
FIGS. 4 and 5 depict two views of the web 4.
Figure 5:
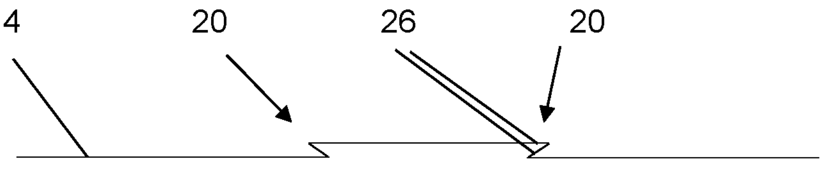

The folding of the web 4 is depicted in FIGS. 4 and 5. FIG. 5 is a view along the line A-A in FIG. 4. By means of the first deforming edge 14, a first deformation 21 of the initially plane web 4 takes place. The web 4, while it is moved long the rotating objects 23 of the here two folding units 7, is then progressively bent around the rotating objects 23 of two adjacent sets of folding means 16, 17, whereby the outer, preferably pointed, circumference of the rotating objects of the sets of folding means progressively form the fold as particularly depicted in FIG. 4 with the dotted line. From FIG. 5 it can be seen that each fold comprises at least two legs 26, wherein one leg can be subsequently and/or simultaneously be sealed. In a final step, the web is shaped back into an essentially plane shape with the exception of the folds 20. This is carried out by second deforming means 15.

REFERENCE SIGNS

1 Flow-wrapper
2 Form-fill tube
3 Form shoulder
4 Web, web of packaging material, film-web, paper-web
5 Longitudinal sealing-means
6 Cross sealing means and/or Cutting means
7 folding unit
8 Frame/Housing
9 Reel
10 Package/Quattro-seal
11 Longitudinal seal
12 corner fold, seal, corner seal
13 cross seal
14 first deforming edge
15 second deforming edge
16 first set of folding means
17 second set of folding means
18 support
19 direction of motion of the web
20 fold
21 first transversal forming of the web
22 second transversal forming of the web
23 rotating object, disk
24 axis of rotation, pivot axis
25 line connecting the centre axis of the rotating objects of one set of folding means
26 legs of the fold 20
α angle

The invention claimed is:

1. A vertical flow-wrapper comprising:
a folding unit for forming at least one fold in a web of a packaging material that is moving, the folding unit comprising at least two sets of folding means;
a sealing station downstream from the folding unit for sealing the at least one fold;
a web feed, which feeds the web via the folding unit and the sealing station to a form-shoulder and a form-fill tube, which form the web into a web-tube;
longitudinal sealing-means to seal longitudinal edges of the web tube together; and
cross sealing means to provide a cross-seal to the web tube to produce individual packages,
wherein each of the at least two sets of folding means comprises at least one rotating object, and an axis of rotation of the at least one rotating object of each of the at least two sets of folding means are provided along a line, and the line is provided at an angle relative to a transportation of the web.

2. The vertical flow-wrapper according to claim 1, wherein each of the at least two sets of folding means comprises a multitude of rotating objects.

3. The vertical flow-wrapper according to claim 2, wherein the line is a straight line or a curved line.

4. The vertical flow-wrapper according to claim 1, wherein each of the at least two sets of folding means are provided per fold.

5. The vertical flow-wrapper according to claim 4, wherein an angle of each of the at least two sets of folding means differ.

6. The vertical flow-wrapper according to claim 4, wherein the at least two sets of folding means are vertically staggered.

7. The vertical flow-wrapper according to claim 4, wherein an outer circumference of the at least one rotating objects of the at least two sets of folding means partially overlap.

8. The vertical flow-wrapper according to claim 1, wherein a first deformation edge is provided upstream from the folding unit, which deforms the web that is flat.

9. The vertical flow-wrapper according to claim 1, wherein a second deformation edge is provided downstream from the folding unit, which deforms the web that is folded back into an essentially flat shape.

* * * * *